(12) United States Patent
Kaneko

(10) Patent No.: US 6,836,376 B2
(45) Date of Patent: Dec. 28, 2004

(54) IMAGING LENS SYSTEM

(75) Inventor: Isamu Kaneko, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 10/620,106

(22) Filed: Jul. 15, 2003

(65) Prior Publication Data

US 2004/0061955 A1 Apr. 1, 2004

(30) Foreign Application Priority Data

Jul. 15, 2002 (JP) .......................... 2002-205836

(51) Int. Cl.$^7$ .......................... G02B 15/14; G02B 9/04; G02B 21/02; G02B 3/02
(52) U.S. Cl. .................. 359/692; 359/661; 359/717; 359/793; 359/795
(58) Field of Search .................. 359/692, 793, 359/795, 736, 785, 717, 661, 646, 566

(56) References Cited

U.S. PATENT DOCUMENTS

| | | | | |
|---|---|---|---|---|
| 5,329,403 A | * | 7/1994 | Fukasawa | 359/717 |
| 6,011,660 A | * | 1/2000 | Nagahara | 359/793 |
| 6,466,377 B1 | | 10/2002 | Saito et al. | 359/661 |
| 6,560,043 B1 | | 5/2003 | Saito et al. | 359/785 |
| 6,724,532 B1 | * | 4/2004 | Fu et al. | 359/566 |

* cited by examiner

Primary Examiner—Loha Ben
(74) Attorney, Agent, or Firm—Koda & Androlia

(57) ABSTRACT

An imaging lens system includes, in the named order from the side of an object toward an image surface, a light amount diaphragm, a first lens having a positive power with a main power on the side closer to the image surface, a meniscus-shaped second lens having a negative power with a strong concave surface turned toward the image surface. Thus, it is possible to provide the imaging lens system in which a sufficiently high resolution can be obtained, while meeting the demand for a reduction in entire length of an optical system to provide the compactness.

4 Claims, 13 Drawing Sheets

MALTIPLIED CHROMATIC ABERRATION (mm)

MALTIPLIED CHROMATIC ABERRATION (mm)

MALTIPLIED CHROMATIC ABERRATION (mm)

MALTIPLIED CHROMATIC ABERRATION (mm)

IMAGING LENS SYSTEM

BACKGROUND OF THE INVENTION

1. Field of the Invention

The present invention relates to an imaging lens system and particularly, to an imaging lens system suitable for use in an image-taking device using an image sensor element such as CCD, CMOS and the like.

2. Description of the Related Art

In recent years, multi-media have been developed remarkably. For example, the demand for a camera utilizing a solid image sensor element such as CCD, CMOS and the like mounted in a mobile phone or the like, e.g., a CCD camera has been increased. Such a CCD camera is required to be mounted in a limited space and hence, it is desired that the CCD camera is small-sized and lightweight. Therefore, it is required that an imaging lens system used in the CCD camera is also small-sized and lightweight.

Various optical systems for such an imaging lens system have been conventionally proposed depending on the application of the imaging lens system, and optical systems intended to be small-sized and lightweight have been also proposed for cameras to be mounted in a mobile phone as described above.

For the above-described camera utilizing the solid image sensor, the requirements for not only reductions in size and weight but also an increase in resolution have been more and more increased recently.

However, to realize the reductions in size and weight, a restriction is naturally imposed on even the entire length (a dimension in a direction of an optical axis) of an optical system incorporated into a camera and for this reason, a lens arrangement is obliged to be simple. When a lens system of a single-lens arrangement which is simplest is yet used, the following problem is encountered: The entire length of the optical system can be fallen into a satisfactory range, but an astigmatism and a chromatic aberration cannot be corrected satisfactorily, and a sufficient resolution (e.g., 640×480 dots) cannot be obtained.

An optical system using a lens system of a two-lens arrangement has been also proposed. Even in this case, however, the restriction on the entire length of the optical system and the required resolution are not satisfied simultaneously and insufficient.

On the other hand, if the lens system is formed in a three-lens arrangement, the required resolution can be satisfied, but the restriction on the entire length of the optical system cannot be satisfied.

The fact is that an optical system sufficient and effective for solution of the subject that a sufficient high resolution is obtained while reducing the entire length of the optical system has been still proposed.

SUMMARY OF THE INVENTION

Accordingly, it is an object of the present invention to provide an imaging lens system, wherein a sufficient high resolution can be obtained, while meeting the needs for reduction in entire length of the optical system to provide the compactness.

To achieve the above object, according to a first aspect and feature of the present invention, there is provided an imaging lens system comprising, in the named order from the side of an object toward an image surface, a light amount diaphragm, a first lens having a positive power with a main power on the side closer to the image surface, a meniscus-shaped second lens having a negative power with a strong concave surface turned toward the image surface.

With the arrangement of the first feature, various aberrations can be corrected satisfactorily to provide a sufficient high resolution. Despite use of the two lenses, the entire length of the lens system can be reduced sufficiently and thus, it is possible to realize the imaging lens system which is compact and has a high resolution and a high quality.

According to a second aspect and feature of the present invention, in addition to the first feature, the following condition expressions (1) and (2) are satisfied:

$$-1.9 < f/f_2 < -0.5 \quad (1)$$

$$1.3 < f/f_1 < 2.1 \quad (2)$$

wherein f is a focal length of a combination of the lenses;

$f_2$ is a focal length of the second lens; and $f_1$ is a focal length of the first lens.

With the arrangement of the second feature, the entire length can be reduced, while ensuring a sufficient back focus, and the resolution and the quality of an image can be further enhanced, by ensuring that the second lens satisfies the expression (1) and the first lens satisfies the expression (2).

According to a third aspect and feature of the present invention, in addition to the first or second feature, the following condition expressions (3) and (4) are satisfied:

$$v_1 > 50 \quad (3)$$

$$v_2 < 40 \quad (4)$$

wherein $v_1$ is an Abbe number of the first lens, and $v_2$ is an Abbe number of the second lens.

With the arrangement of the third feature, the generation of a chromatic aberration in the first lens can be reduced by ensuring that the first lens satisfies the condition expression (3), and a chromatic aberration, still remaining even when the expression (3) is satisfied, can be corrected further positively in the second lens by ensuring that the second lens satisfies the condition expression (4). Thus, it is possible to realize the imaging lens system in which the chromatic aberration is further corrected.

According to a fourth aspect and feature of the present invention, in addition to the second or third feature, the following condition expressions are satisfied:

$$0.3\,f < d_1 \quad (5)$$

$$d_2 < 0.3\,f \quad (6)$$

wherein $d_1$ is a thickness of the first lens at its center, and $d_2$ is a thickness of the second lens at its center.

With the arrangement of the fourth feature, the astigmatism and the distortion can be corrected satisfactorily to further enhance the resolution and the quality of the image, and a sufficient back focus required for the structure can be obtained.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of a preferred embodiment with reference to the accompanying drawings.

Figure 1:
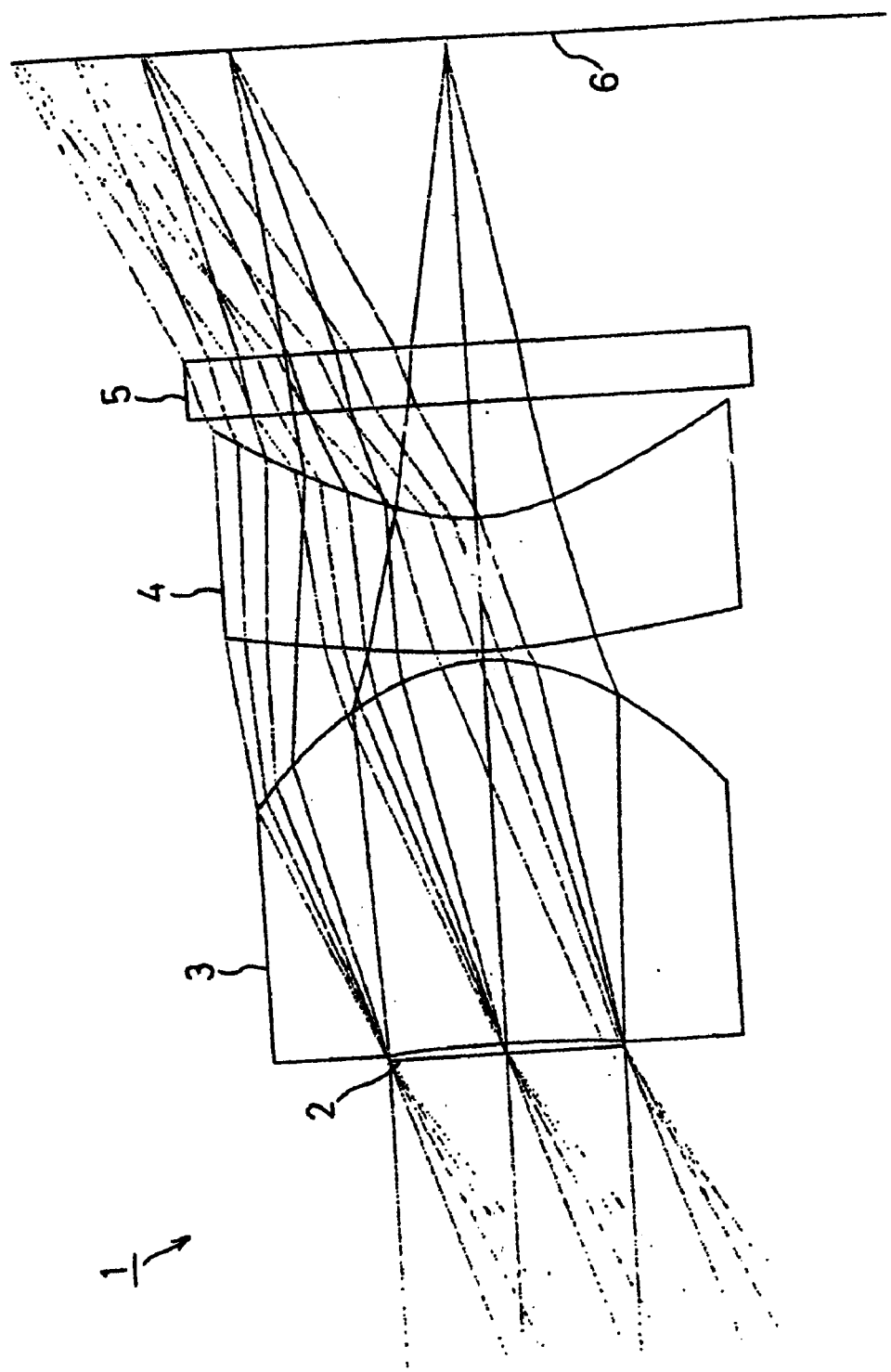
FIG. 1 is a schematic diagram showing the arrangement of an embodiment of an imaging lens system according to the present invention.

Referring to FIG. 1, an imaging lens system 1 comprises a light amount diaphragm 2, a first lens 3, a second lens 4, which are disposed in the named order from the side of an object toward an image surface (an imaging surface) 6 which is a light-receiving surface of a solid image sensor element such as CCD and CMOS. If required depending on the application of the imaging lens system 1, a glass cover 5 or the like may be disposed on the side of the second lens 4 closer to the image surface 6.

In the present embodiment the first lens 3 is a lens of a positive power, which is formed to have a main power on the side of the image surface 6. The second lens 4 is a lens of a meniscus shape having a negative power with its strong concave surface turned on the side of the image surface 6.

Thus, various aberrations can be corrected by lens system of the two-lens arrangement comprising the first lens 3 and the second lens 4 and hence, a sufficient high resolution can be provided. If the imaging lens system 1 is formed in the two-lens arrangement for the purpose of providing a high resolution as described above, the entire length of the second lens 4 can be shortened especially by ensuring that the surface of the second lens 4 on the side of the image surface (the second surface) have a large negative power. Further, the second lens 4 can be formed at a small diameter to provide the compactness of the imaging lens system 1 in a diametrical direction by the disposition of the light amount diaphragm on the side of the first lens 3 closer to the object.

Further, in addition to the above-described arrangement, the first lens 3 and the second lens 4 may be disposed to further satisfy the following expressions (1) and (2):

$$-1.9 < f/f_2 < -0.5 \tag{1}$$

$$1.3 < f/f_1 < 2.1 \tag{2}$$

wherein f in the expressions (1) and (2) is a focal length of the entire lens system comprising the first and second lenses 3 and 4; $f_2$ in the expression (1) is a focal length of the second lens 4; and $f_1$ in the expression (2) is a focal length of the first lens 3.

If a value of $f/f_2$ in the expression (1) is equal to or smaller than −1.9 in the expression (1), a distance from a back focus and the image surface 6 to an injection pupil is too shortened and hence, the cover glass 5 or the like cannot be disposed between the imaging lens system 1 and the image surface 6. In other words, there is arisen a structural disadvantage that the imaging lens system 1 cannot be constructed appropriately.

If the value of $f/f_2$ is equal to or larger than −0.5 in the expression (1), the curvature of a sagital image surface (S-image surface) is corrected insufficiently and thus, the image is blurred partially.

If the value of $f/f_1$ is equal to or smaller than 1.3 in the expression (2), an angle of view is too narrow. This is synonymous with that the value of f is larger, i.e. the entire length of the imaging lens system 1 is larger, resulting in a disadvantage that this is contrary to the demand for the compactness.

On the other hand, if the value of $f/f_1$ is equal to or larger than 2.1 in the expression (2), the value of f is too short and hence, a sufficient back focus cannot be obtained and thus, the cover glass 5 or the like cannot be disposed between the imaging lens system 1 and the image surface 6.

Therefore, if the second lens 4 is formed to satisfy the expression (1) and the first lens 3 is formed to satisfy the expression (2), the imaging lens system 1 having a shortened entire length and a high resolution can be realized. Further, especially, it is possible to correct the curvature of the sagital image surface satisfactorily to further enhance the resolution and the quantity of the image. Even if the entire length of the imaging lens system is shortened, a sufficient back focus required for the structure can be obtained.

It is desirable that the value of $f/f_2$ is preferably set in a range of $-1.9 < f/f_2 < -0.8$. It is also desirable that the value of $f/f_1$ is preferably set in a range of $1.5 < f/f_1 < 2.1$.

If these values are set in the above-described ranges, the imaging lens system having a shortened entire length and a high resolution can be realized.

In addition to the above-described arrangement, the first and second lenses 3 and 4 may be formed to further satisfy the following expressions (3) and (4):

$$v_1 > 50 \tag{3}$$

$$v_2 < 40 \tag{4}$$

wherein $v_1$ in the expression (3) is an Abbe number of the first lens 3, and $v_2$ in the expression (4) is an Abbe number of the second lens 4.

If these lenses are formed as described above, the generation of a chromatic aberration in the first, lens 3 can be reduced by forming the first lens 3 to satisfy the condition expression (3). Further, a chromatic aberration still remaining even when the expression (3) is satisfied can be corrected further positively in the second lens 4 by forming the second lens 4 to satisfy the expression (4). Thus, the chromatic aberration can be corrected further satisfactorily to further enhance the resolution and the quality of the image.

Further, in addition to the above-described arrangement, the first and second lenses 3 and 4 may be formed to satisfy the following condition expressions:

$$0.3\,f < d_1 \quad (1)$$

$$d_2 < 0.3\,f \quad (2)$$

wherein $d_1$ in the expression (5) is a thickness of the first lens 3 at its center, and $d_2$ in the expression (6) is a thickness of the second lens 4 at its center.

If the value of d1 is equal to or smaller than 0.3 f shown in the expression (5), an astigmatism is larger and further, the absolute value of a negative distortion is larger.

If the value of $d_2$ is equal to or larger than 0.3 f shown in the expression (6), the back focus is too short.

Therefore, if the first lens 3 is formed to satisfy the expression (5) and the second lens 3 is formed to satisfy the expression (6), the astigmatism and the distortion can be corrected satisfactorily to further enhance the resolution and the quality of the image, and even if the entire length of the imaging lens system is shortened, a sufficient back focus required for the structure can be obtained appropriately.

It is desirable that the value of $d_1$ is preferably set to satisfy $0.4\,f < d_1$, and it is also desirable that the value of $d_2$ is set to satisfy $d_2 < 0.25\,f$. If these values are set as described above, it is possible to realize the imaging lens system 1 more compact and excellent in resolution and in quality of the image, while ensuring the sufficient back focus.

EXAMPLES

Examples of the present invention will now be described with reference to FIGS. 2 to 13.

In the examples, f represents a focal length of the entire lens system; $f_1$ represents a focal length of a first lens 3; $f_2$ represents a focal length of a second lens; and FNO represents an F number. In addition, ω represents an angle of half view, wherein 2ω two times the half angle of view is an angle of full view (an angle of diagonal view); r represents a radius of curvature of an optical system or the like (a radius of curvature at a center in a case of a lens); d represent a thickness of the optical system or an air gap; ne represents an index of refraction of each optical system when an e-ray (green) has been applied; and vd represents an Abbe number of each optical system when a d-ray (yellow) has been applied.

Each of k, A, B and C indicates an index in an equation (7) shown below. Namely, if a Z-axis is taken in a direction of an optical axis; an Y-axis is taken in a direction perpendicular to the optical axis; and a direction of running of light is positive, the aspherical shape of the lens is represented in the following equation (7):

$$Z(Y) = r^{-1}Y^2/[1+\{1-(k+1)r^{-2}Y^2\}^{1/2}] + AY^4 + BY^6 + CY^8 \quad (7)$$

First Example

Figure 2:
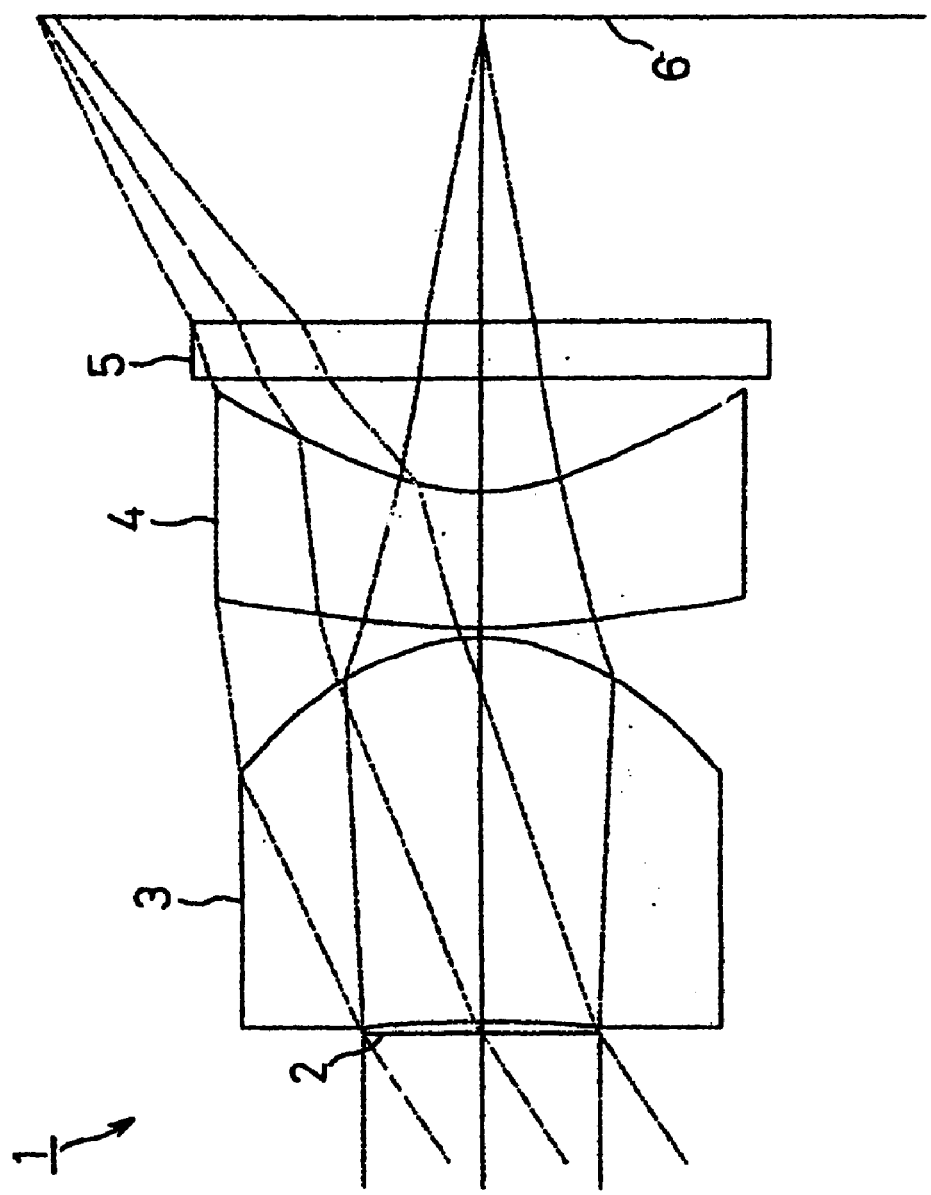
FIG. 2 is a schematic diagram showing the arrangement of a first example of an imaging lens system according to the present invention.

FIG. 2 shows an imaging lens system according to a first example of the present invention. In this example, a light amount diaphragm 2 is disposed on the side of a first lens 3 closer to an object, and a cover glass 5 is disposed on the side of a second lens 4 closer to an image surface 6, as in the imaging lens system 1 of the arrangement shown in FIG. 1.

The imaging lens system 1 according to the first example is set under the following conditions: f=3.40 mm; FNO=2.8; 2ω=67.5°; $f_1$=1.81 mm; $f_2$=−2.48 mm

| Surface | Radius of curvature r | Distance d between surfaces | Index ne of refraction | Abbe number vd |
|---|---|---|---|---|
| (Object) | | ∞ | | |
| (Diaphragm) | | 0.05 | | |
| 1 (First surface of first lens) | −14.728 | 2.00 | 1.52692 | 56.2 |
| 2 (Second surface of first lens) | −0.936 | 0.05 | | |
| 3 (First surface of second lens) | 3.417 | 0.70 | 1.58961 | 30.0 |
| 4 (Second surface of second lens) | 0.945 | 0.60 | | |
| 5 (First surface of glass cover) | 0 | 0.30 | 1.51825 | 64.2 |
| 6 (Second surface of glass cover) (Image surface) | 0 | 1.575 | | |

| Surface | k | A | B | C |
|---|---|---|---|---|
| 1 | 0 | −6.509443E−2 | −5.683406E−2 | 0 |
| 2 | −2.823271 | −9.306843E−2 | 2.531014E−3 | 0 |
| 3 | 0 | −6.564036E−2 | 1.590278E−2 | 0 |
| 4 | −4.029063 | −2.736213E−3 | 5.491188E−3 | 0 |

Under such conditions, $f/f_2 = -1.371$, which satisfies the expression (1). In addition, $f/f_1 = 1.878$, which satisfies the expression (2).

Further, $v_1 = 56.2$, which satisfies the expression (3), and $v_2 = 30.0$, which satisfies the expression (4).

Yet further, $d_1 = 0.588\,f$, which satisfies the expression (5), and $d_2 = 0.206\,f$, which satisfies the expression (6).

Figure 3:
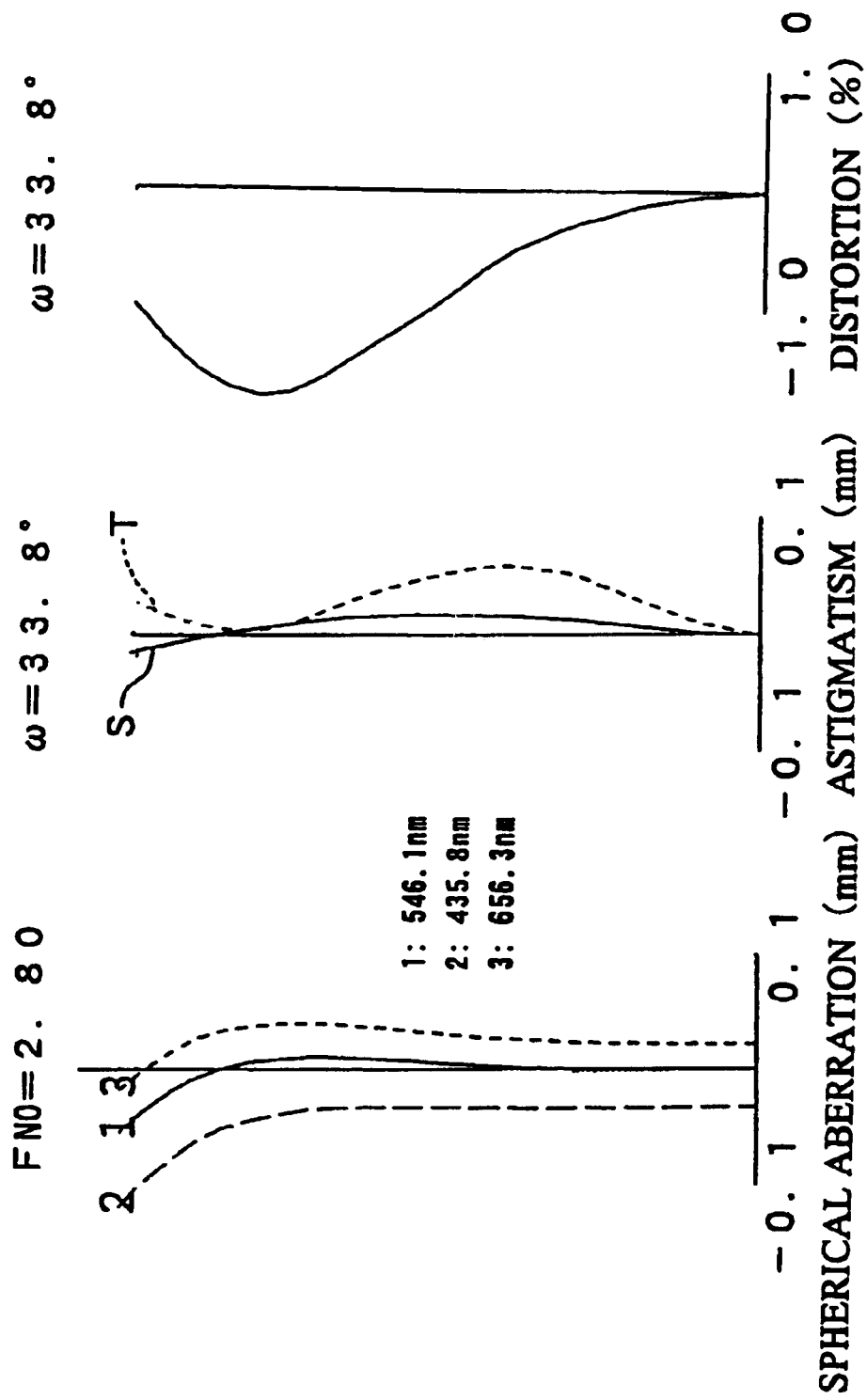
FIG. 3 is a diagram showing the spherical aberration, the astigmatism and the distortion in the imaging lens system shown in FIG. 2.
Figure 4:
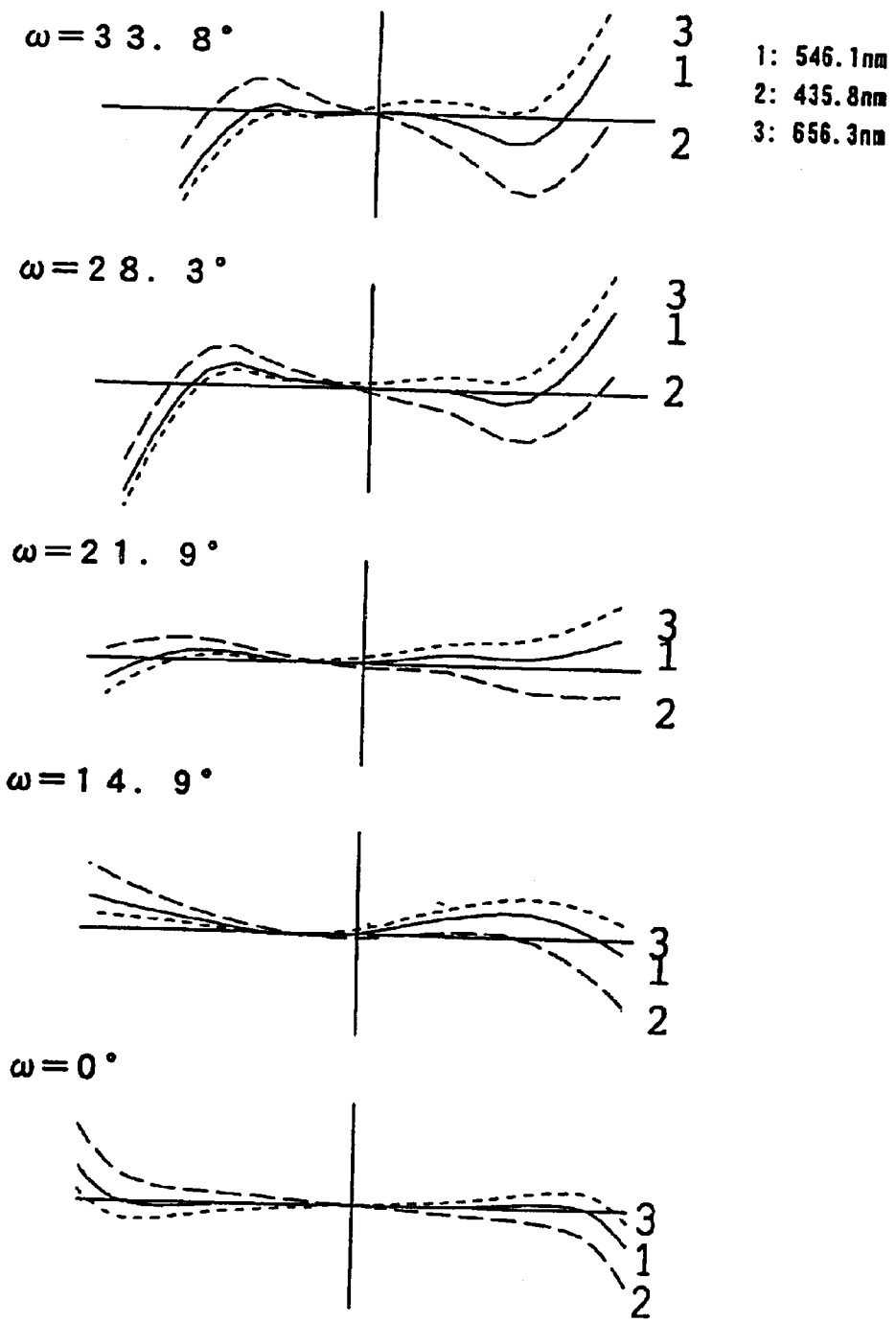
FIG. 4 is a diagram showing the multiplied chromatic aberration in the imaging lens system shown in FIG. 2.

The spherical aberration, the astigmatism and the distortion in the imaging lens system 1 according to the first example are shown in FIG. 3, and the multiplied chromatic aberration is shown in FIG. 4.

It can be seen from these results that any of the spherical aberration, the astigmatism, the distortion and the multiplied chromatic aberration are substantially satisfactory, and sufficient optical characteristics can be obtained.

Second Example

Figure 5:
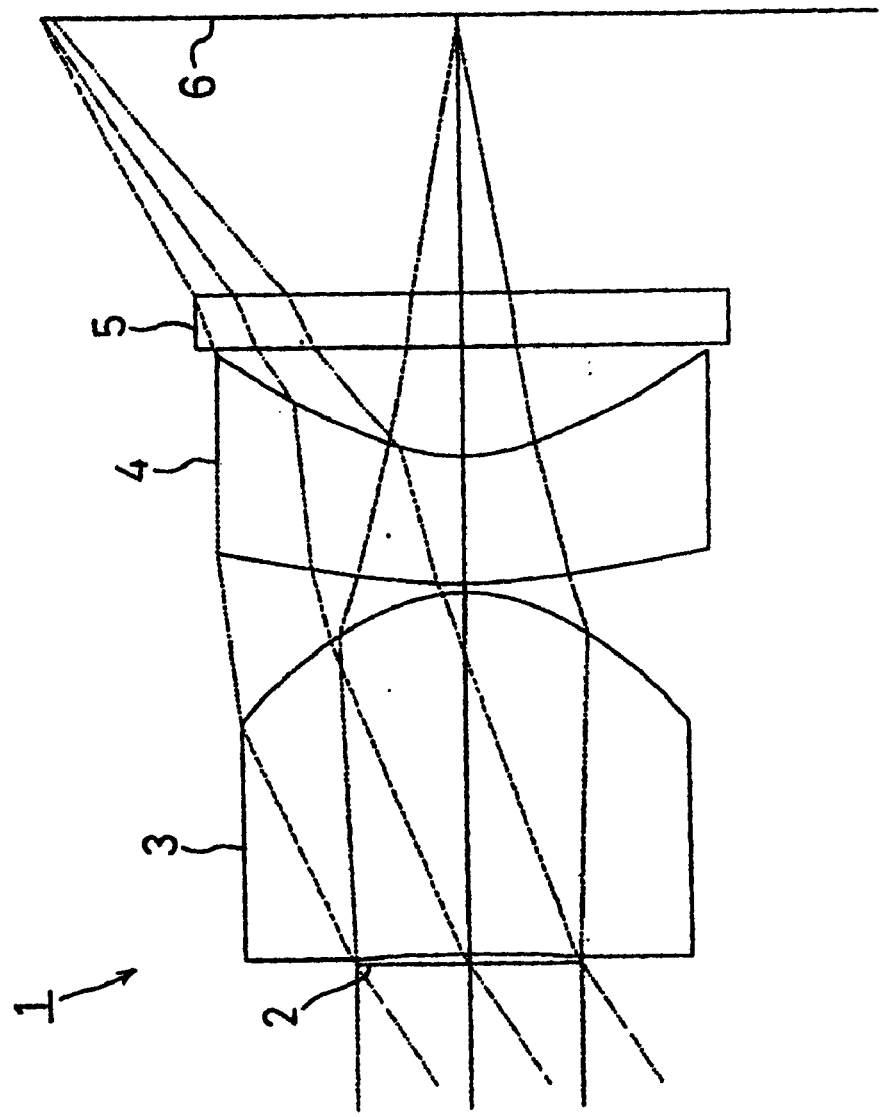
FIG. 5 is a schematic diagram showing the arrangement of a second example of an imaging lens system according to the present invention.

FIG. 5 shows a second example of the present invention. In this example, a light amount diaphragm 2 is disposed on the side of a first lens 3 closer to an object, and a cover glass 5 is disposed on the side of a second lens 4 closer to an image surface 6, as in the imaging lens system 1 of the arrangement shown in FIG. 1.

The imaging lens system 1 according to the second example is set under the following conditions: f=3.40 mm; FNO=2.8; 2ω=66.2°; $f_1$=1.84 mm; $f_2$=−2.46 mm

| Surface | Radius of curvature r | Distance d between surfaces | Index ne of refraction | Abbe number vd |
|---|---|---|---|---|
| (Object) | | ∞ | | |
| (Diaphragm) | | 0.05 | | |

-continued

| Surface | Radius of curvature r | Distance d between surfaces | Index ne of refraction | Abbe number vd |
|---|---|---|---|---|
| 1 (First surface of first lens) | −25.266 | 2.00 | 1.49405 | 57.0 |
| 2 (Second surface of first lens) | −0.899 | 0.05 | | |
| 3 (First surface of second lens) | 3.105 | 0.70 | 1.58961 | 30.0 |
| 4 (Second surface of second lens) | 0.905 | 0.60 | | |
| 5 (First surface of glass cover) | 0 | 0.30 | 1.51825 | 64.2 |
| 6 (Second surface of glass cover) (Image surface) | 0 | 1.499 | | |

| Surface | k | A | B | C |
|---|---|---|---|---|
| 1 | 0 | −6.755532E−2 | −4.773123E−2 | 0 |
| 2 | −2.713984 | −8.656371E−2 | −2.012928E−3 | 0 |
| 3 | 0 | −5.820067E−2 | 1.221951E−2 | 0 |
| 4 | −3.817369 | 6.869367E−3 | 3.343374E−3 | 0 |

Under such conditions, $f/f_2 = -1.382$, which satisfies the expression (1). In addition $f/f_1 = 1.848$, which satisfies the expression (2).

Further, $v_1 = 57.0$, which satisfies the expression (3), and $v_2 = 30.0$, which satisfies the expression (4).

Yet further, $d_1 = 0.588$ f, which satisfies the expression (5), and $d_2 = 0.206$ f, which satisfies the expression (6).

Figure 6:
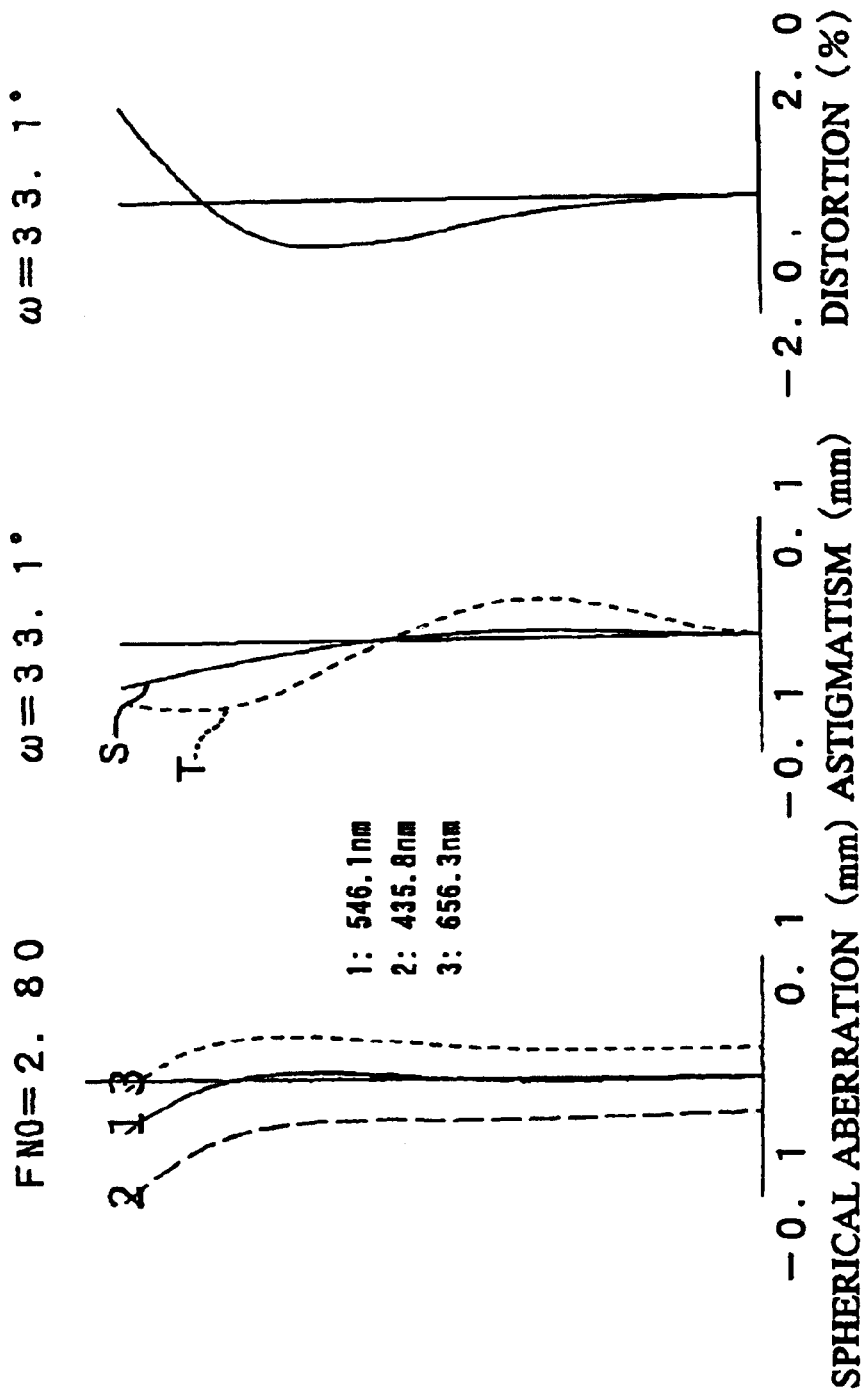
FIG. 6 is a diagram showing the spherical aberration, the astigmatism and the distortion in the imaging lens system shown in FIG. 5.
Figure 7:
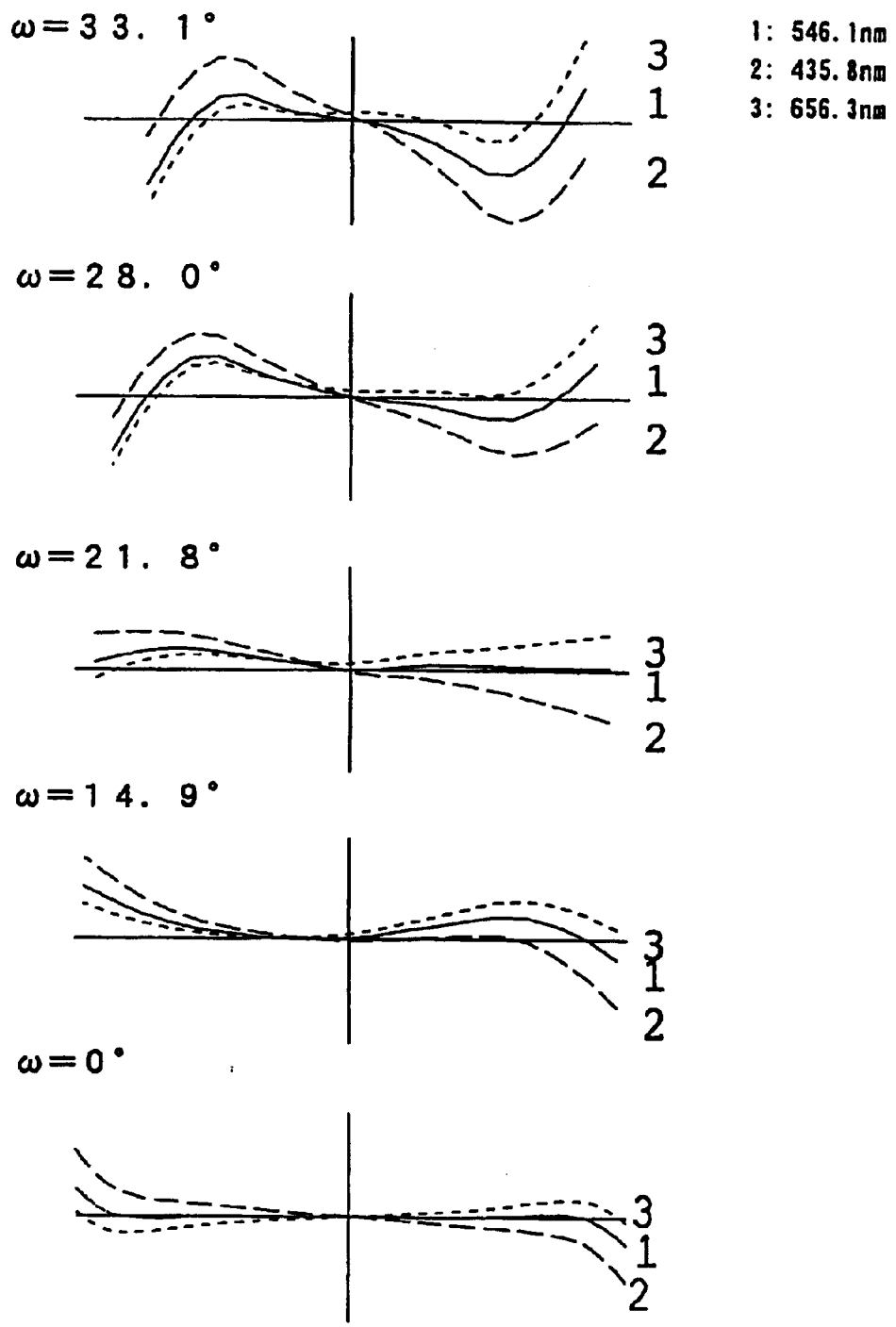
FIG. 7 is a diagram showing the multiplied chromatic aberration in the imaging lens system shown in FIG. 5.

The spherical aberration, the astigmatism and the distortion in the imaging lens system 1 according to the second example are shown in FIG. 6, and the multiplied chromatic aberration is shown in FIG. 7.

It can be seen from these results that any of the spherical aberration, the astigmatism, the distortion and the multiplied chromatic aberration are substantially satisfactory, and sufficient optical characteristics can be obtained.

Third Example

Figure 8:
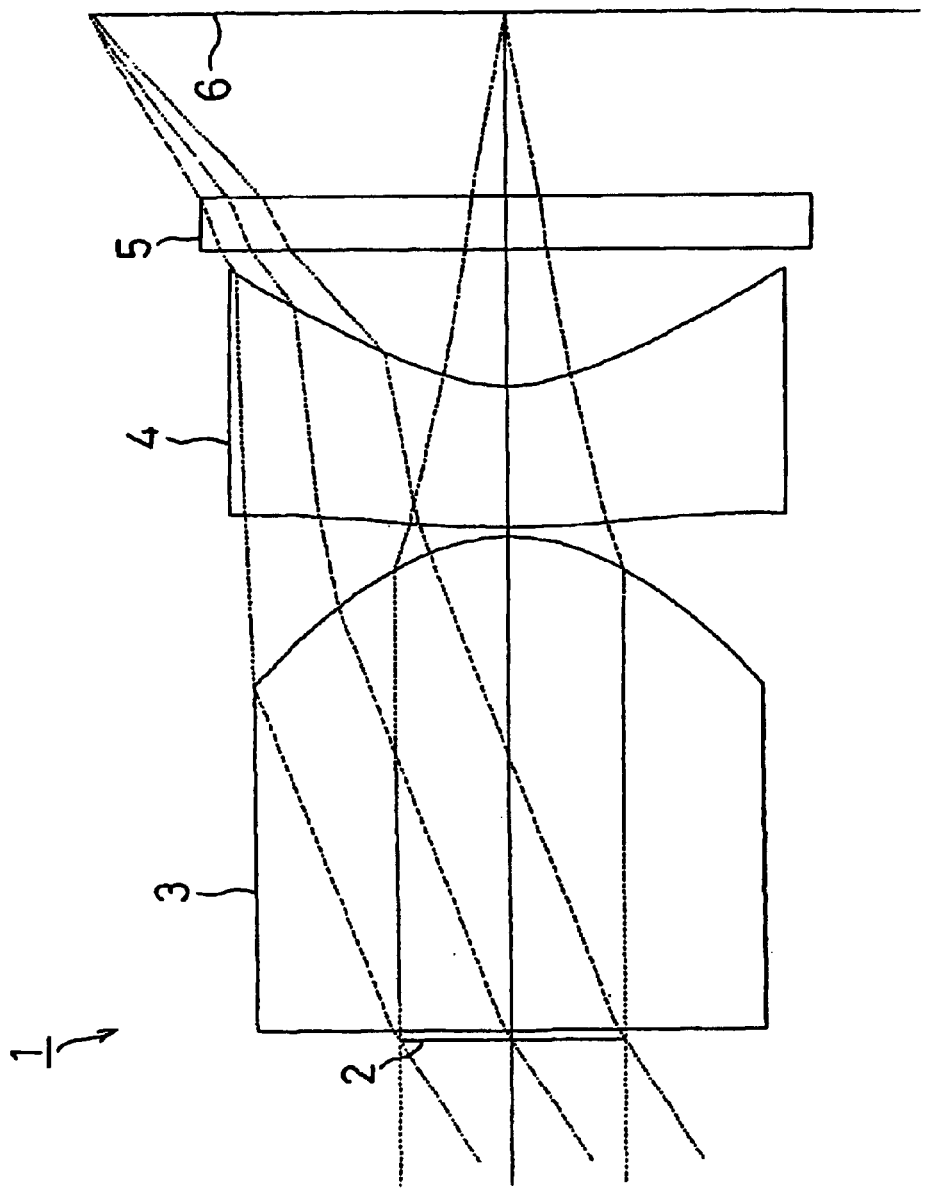
FIG. 8 is a schematic diagram showing the arrangement of a third example of an imaging lens system according to the present invention.

FIG. 8 shows an imaging lens system according to a first example of the present invention. In this example, a light amount diaphragm 2 is disposed on the side of a first lens 3 closer to an object, and a cover glass 5 is disposed on the side of a second lens 4 closer to an image surface 6, as in the imaging lens system 1 of the arrangement shown in FIG. 1.

The imaging lens system 1 according to the first example is set under the following conditions: f=3.40 mm; FNO=2.8; 2ω=66.3°; $f_1 = 1.71$ mm; $f_2 = -1.87$ mm

| Surface | Radius of curvature r | Distance d between surfaces | Index ne of refraction | Abbe number vd |
|---|---|---|---|---|
| (Object) | | ∞ | | |
| (Diaphragm) | | 0.05 | | |
| 1 (First surface of first lens) | 16.926 | 2.70 | 1.52692 | 56.2 |
| 2 (Second surface of first lens) | −0.897 | 0.05 | | |
| 3 (First surface of second lens) | 5.129 | 0.78 | 1.58961 | 30.0 |
| 4 (Second surface of second lens) | 0.855 | 0.75 | | |
| 5 (First surface of glass cover) | 0 | 0.30 | 1.51825 | 64.2 |
| 6 (Second surface of glass cover) (Image surface) | 0 | 1.012 | | |

| Surface | k | A | B | C |
|---|---|---|---|---|
| 1 | 0 | −4.218759E−2 | −2.052235E−2 | 0 |
| 2 | −2.884383 | −5.838604E−2 | 1.432816E−3 | 0 |
| 3 | 7.457915 | −4.916200E−2 | 2.133099E−2 | 0 |
| 4 | −4.045224 | −3.851670E−3 | 3.233996E−3 | 0 |

Under such conditions, $f/f_2 = -1.818$, which satisfies the expression (1). In addition, $f/f_1 = 1.988$, which satisfies the expression (2).

Further, $v_1 = 56.2$, which satisfies the expression (3), and $v_2 = 30.0$, which satisfies the expression (4).

Yet further, $d_1 = 0.794$ f, which satisfies the expression (5) and $d_2 = 0.229$ f, which satisfies the expression (6).

Figure 9:
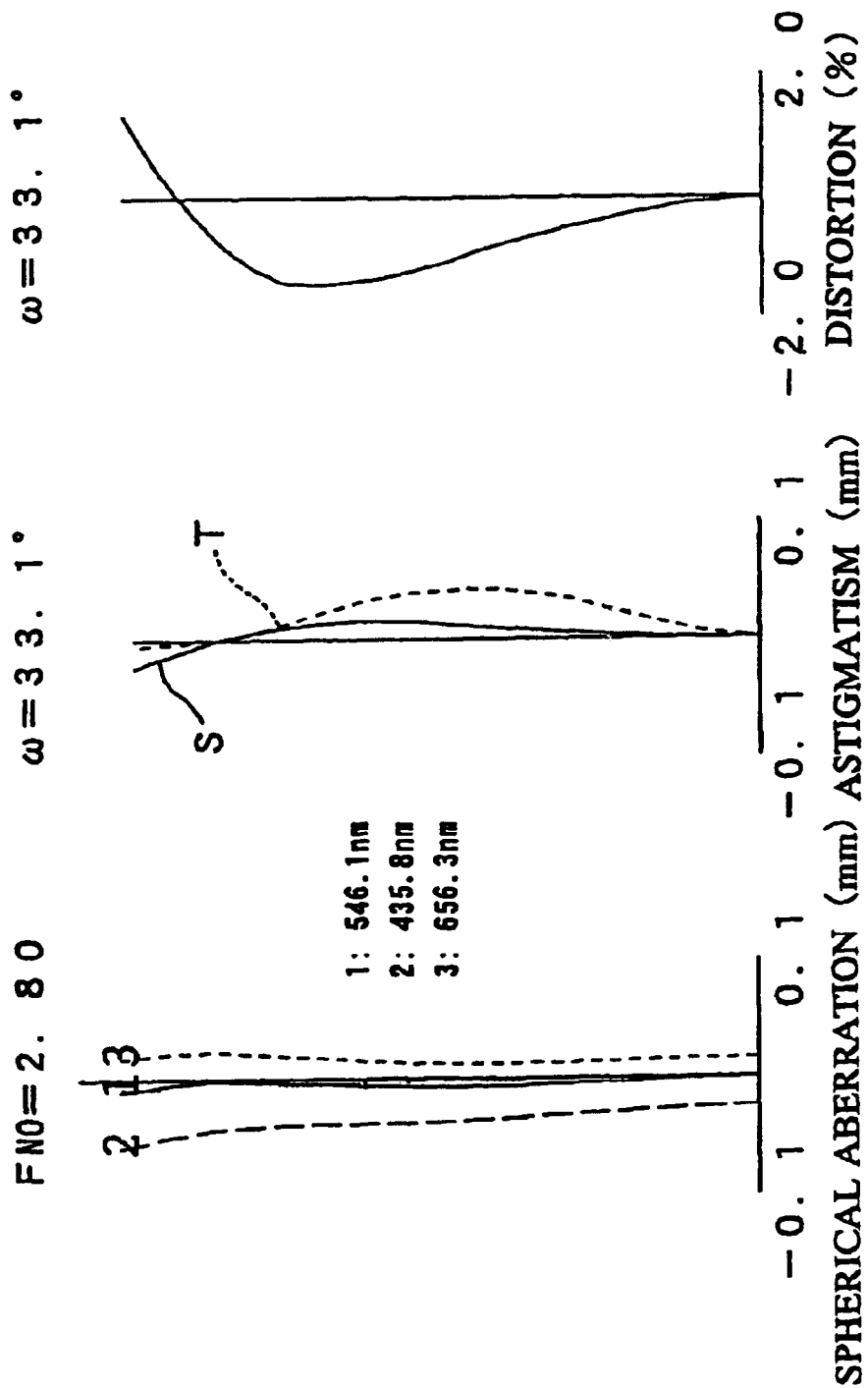
FIG. 9 is a diagram showing the spherical aberration, the astigmatism and the distortion in the imaging lens system shown in FIG. 8.
Figure 10:
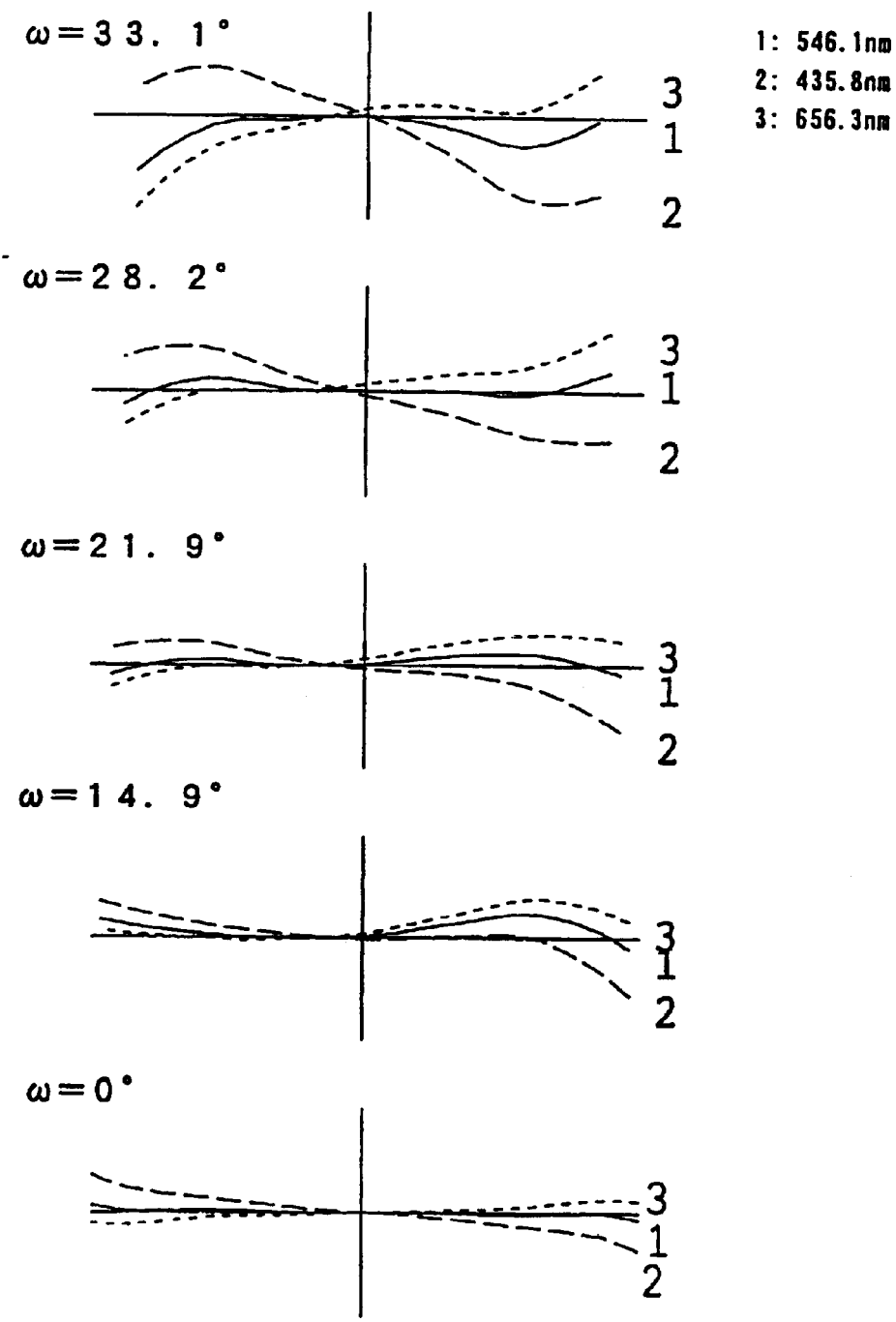
FIG. 10 is a diagram showing the multiplied chromatic aberration in the imaging lens system shown in FIG. 8.

The spherical aberration, the astigmatism and the distortion in the imaging lens system 1 according to the third example are shown in FIG. 9, and the multiplied chromatic aberration is shown in FIG. 10.

It can be seen from these results that any of the spherical aberration, the astigmatism, the distortion and the multiplied chromatic aberration are substantially satisfactory, and sufficient optical characteristics can be obtained.

Fourth Example

Figure 11:
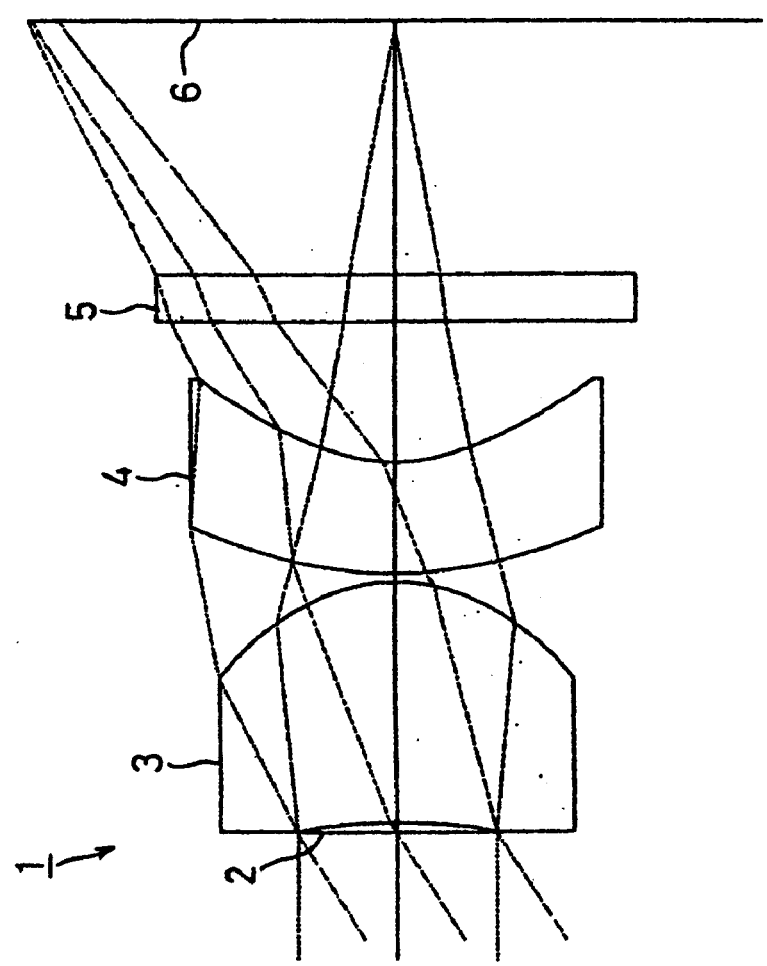
FIG. 11 is a schematic diagram showing the arrangement of a fourth example of an imaging lens system according to the present invention.

FIG. 11 shows an imaging lens system according to a fourth example of the present invention. In this example, a light amount diaphragm 2 is disposed on the side of a first lens 3 closer to an object, and a cover glass 5 is disposed on the side of a second lens 4 closer to an image surface 6, as in the imaging lens system 1 of the arrangement shown in FIG. 1.

The imaging lens system 1 according to the fourth example is set under the following conditions: f=3.50 mm; FNO=2.8; 2ω=65.1°; $f_1 = 2.24$ mm; $f_2 = -4.00$ mm

| Surface | Radius of curvature r | Distance d between surfaces | Index ne of refraction | Abbe number vd |
|---|---|---|---|---|
| (Object) | | ∞ | | |
| (Diaphragm) | | 0.06 | | |
| 1 (First surface of first lens) | −4.873 | 1.500 | 1.52692 | 56.2 |
| 2 (Second surface of first lens) | −1.051 | 0.05 | | |
| 3 (First surface of second lens) | 2.364 | 0.70 | 1.58961 | 30.0 |
| 4 (Second surface of second lens) | 1.050 | 0.89 | | |
| 5 (First surface of glass cover) | 0 | 0.30 | 1.51825 | 64.2 |
| 6 (Second surface of glass cover) (Image surface) | 0 | 1.601 | | |

| Surface | k | A | B | C |
|---|---|---|---|---|
| 1 | 0 | −8.394932E−2 | −1.038451E−1 | 0 |
| 2 | −2.271394 | −7.687520E−2 | −2.173360E−2 | 0 |
| 3 | 0 | −4.642139E−2 | 1.020710E−2 | 0 |
| 4 | −3.200259 | 2.227175E−3 | 2.308215E−3 | 0 |

Under such conditions, $f/f_2 = -0.875$, which satisfies the expression (1). In addition, $f/f_1 = 1.562$, which satisfies the expression (2).

Further, $v_1 = 56.2$, which satisfies the expression (3), and $v_2 = 30.0$, which satisfies the expression (4).

Yet further, $d_1=0.429\ f$, which satisfies the expression (5), and $d_2=0.2\ f$, which satisfies the expression (6).

Figure 12:
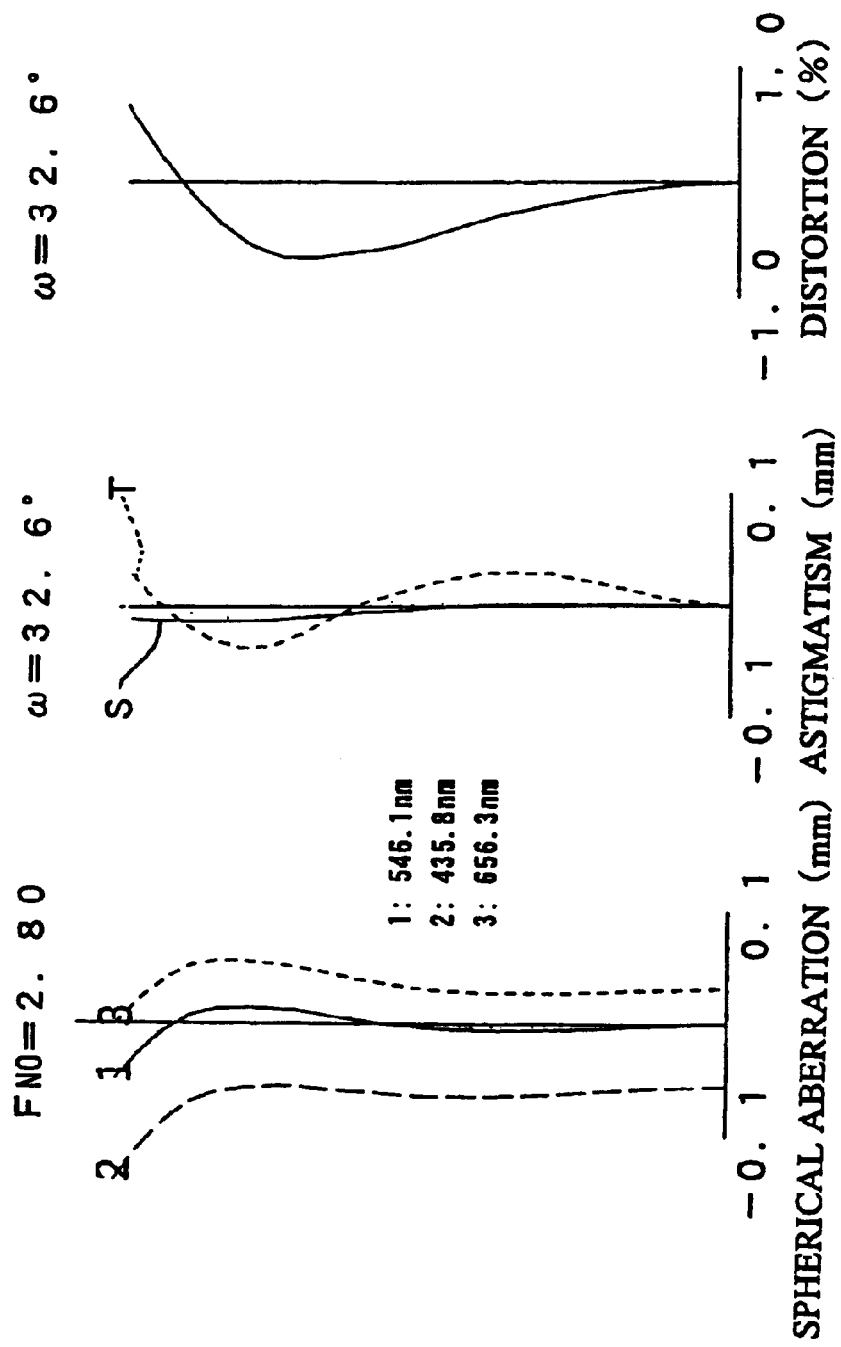
FIG. 12 is a diagram showing the spherical aberration, the astigmatism and the distortion in the imaging lens system shown in FIG. 11.
Figure 13:
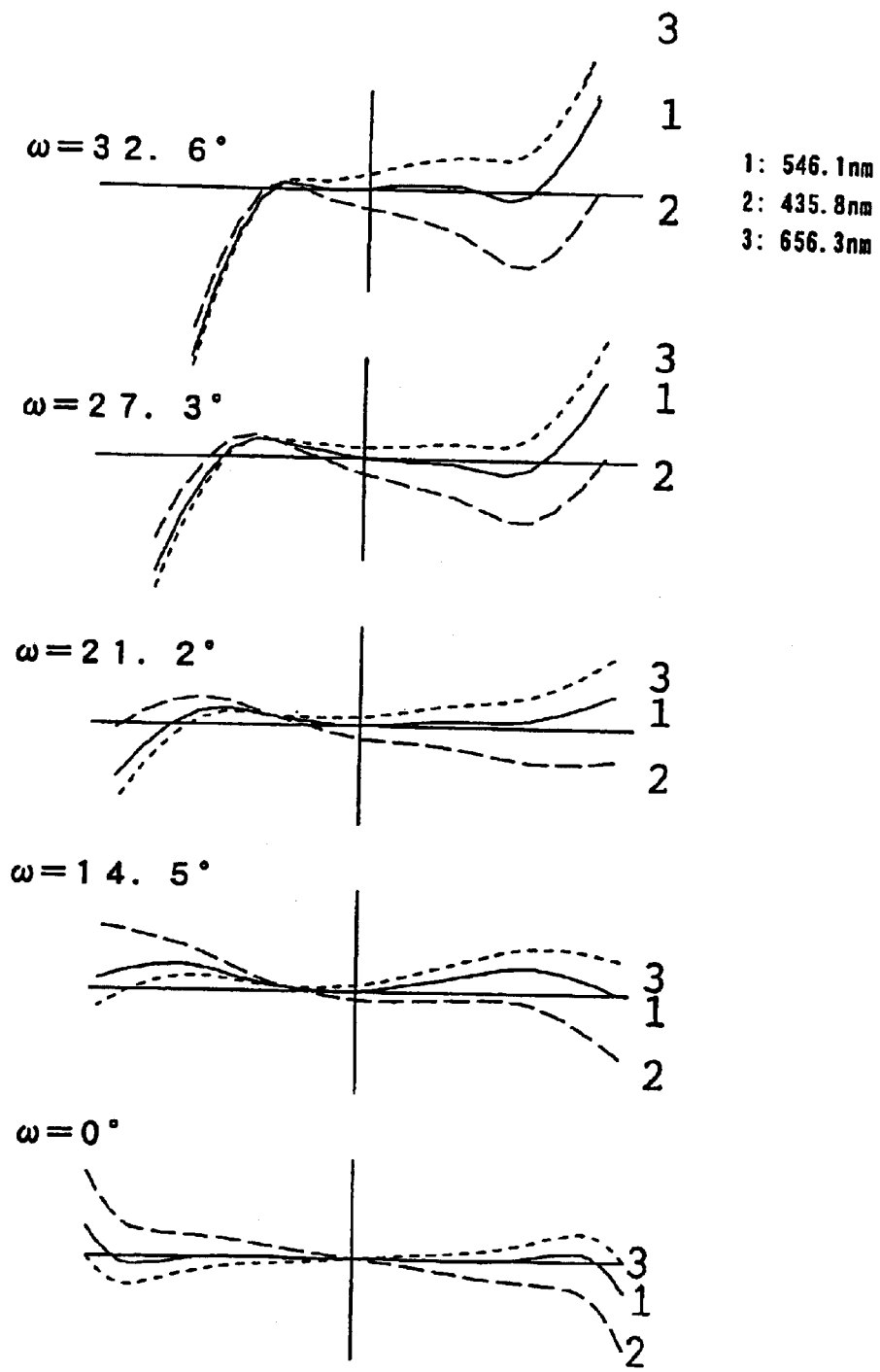
FIG. 13 is a diagram showing the multiplied chromatic aberration in the imaging lens system shown in FIG. 11.

The spherical aberration, the astigmatism and the distortion in the imaging lens system 1 according to the fourth example are shown in FIG. 12, and the multiplied chromatic aberration is shown in FIG. 13.

It can be seen from these results that any of the spherical aberration, the astigmatism, the distortion and the multiplied chromatic aberration are substantially satisfactory, and sufficient optical characteristics can be obtained.

Although the embodiments of the present invention have been described in detail, it will be understood that the present invention is not limited to the above-described embodiments, and various modifications in design may be made without departing from the spirit and scope of the invention defined in claims.

For example, the cover glass 5 is disposed on the side of the second lens 4 closer to the image surface 6 in the embodiment shown in FIG. 1, but a low-pass filter or the like may be disposed in addition to the cover glass 5, or only a low-pass filter or the like may be disposed.

What is claimed is:

1. An imaging lens system comprising, in the named order from the side of an object toward an image surface, a light amount diaphragm, a first lens having a positive power with a main power on the side closer to the image surface, a meniscus-shaped second lens having a negative power with a strong concave surface turned toward the image surface; and wherein the following condition expressions (1) and (2) are satisfied:

$$-1.9 < f/f_2 < -0.5 \quad (1)$$

$$1.3 < f/f_1 < 2.1 \quad (2)$$

wherein f is a focal length of a combination of the lenses;

$f_2$ is a focal length of the second lens; and $f_1$ is a focal length of the first lens.

2. An imaging lens system according to claim 1, wherein the following condition expressions are satisfied:

$$0.3\ f < d_1 \quad (5)$$

$$d_2 < 0.3\ f \quad (6)$$

wherein $d_1$ is a thickness of the first lens at its center, and $d_2$ is a thickness of the second leas at its center.

3. An imaging lens system comprising, in the named order from the side of an object toward an image surface, a light amount diaphragm, a first lens having a positive power with a main power on the side closer to the image surface, a meniscus-shaped second lens having a negative power with a strong concave surface turned toward the image surface; and wherein the following condition expressions (3) and (4) are satisfied:

$$v_1 > 50 \quad (3)$$

$$v_2 < 40 \quad (4)$$

wherein $v_1$ is an Abbe number of the first lens, and $v_2$ is an Abbe number of the second lens.

4. An imaging lens system according to claim 3, wherein the following condition expressions are satisfied:

$$0.3\ f < d_1 \quad (5)$$

$$d_2 < 0.3\ f \quad (6)$$

wherein $d_1$ is a thickness of the first lens at its center, and $d_2$ is a thickness of the second lens at its center.

* * * * *